Patented Jan. 27, 1931

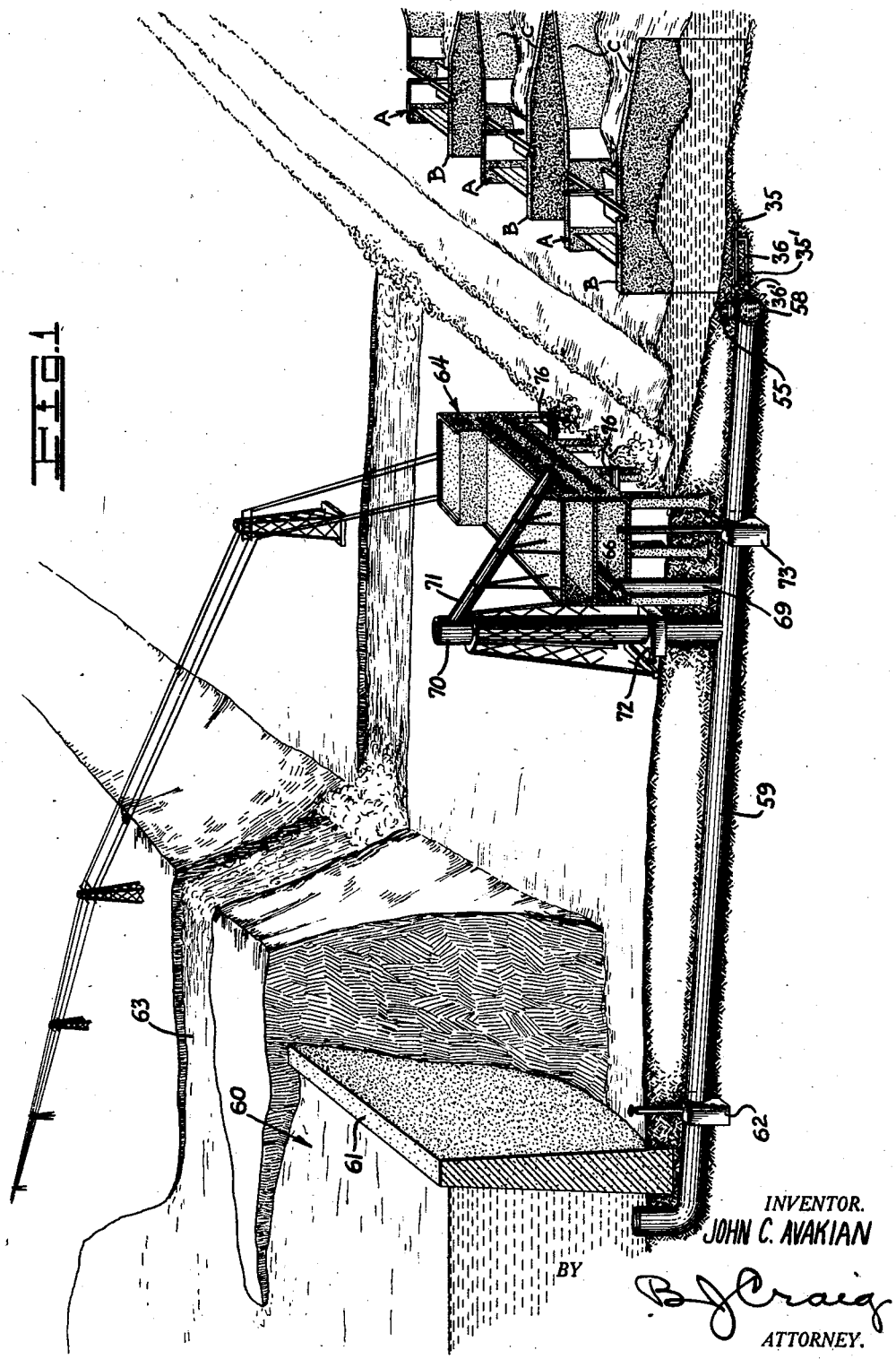

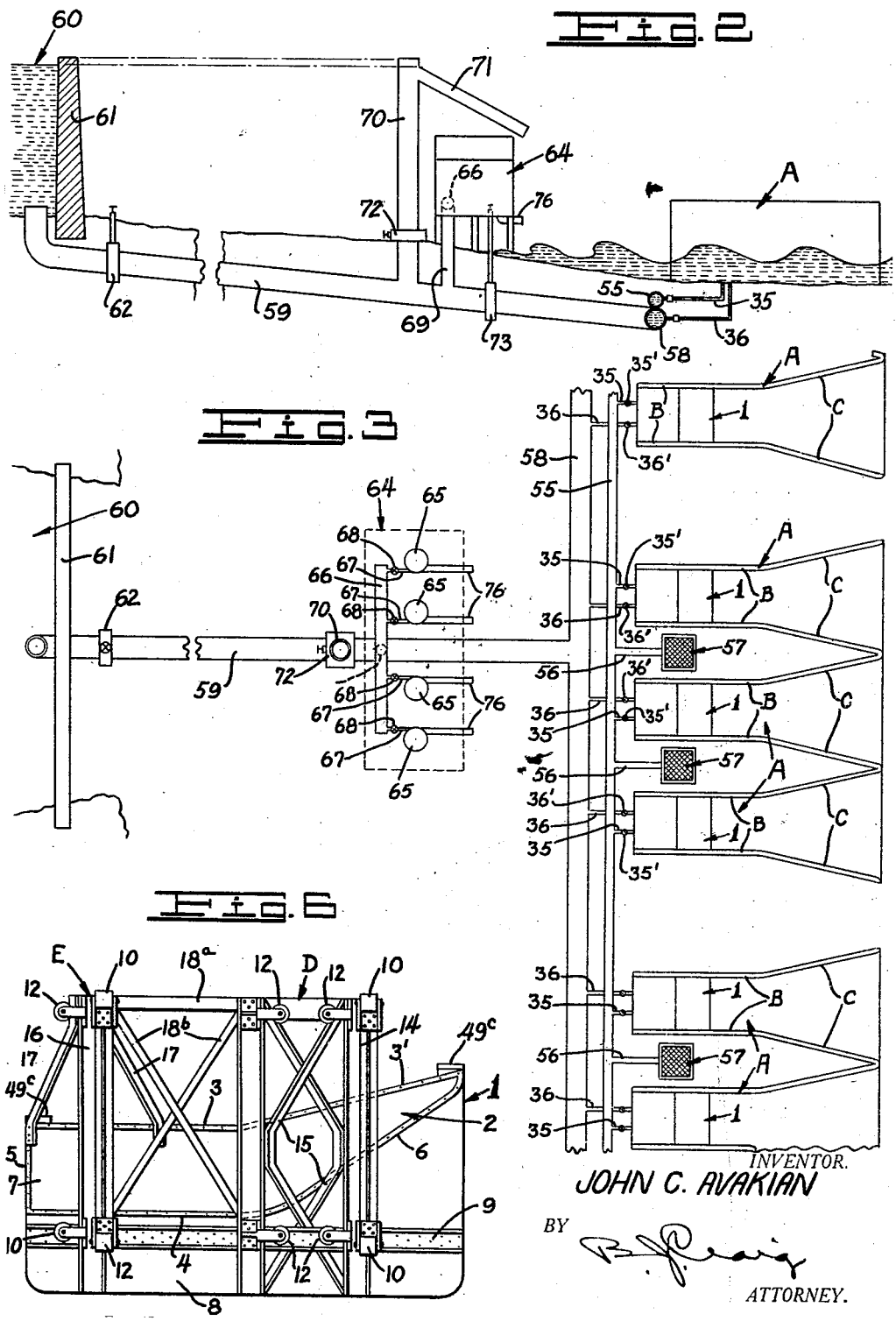

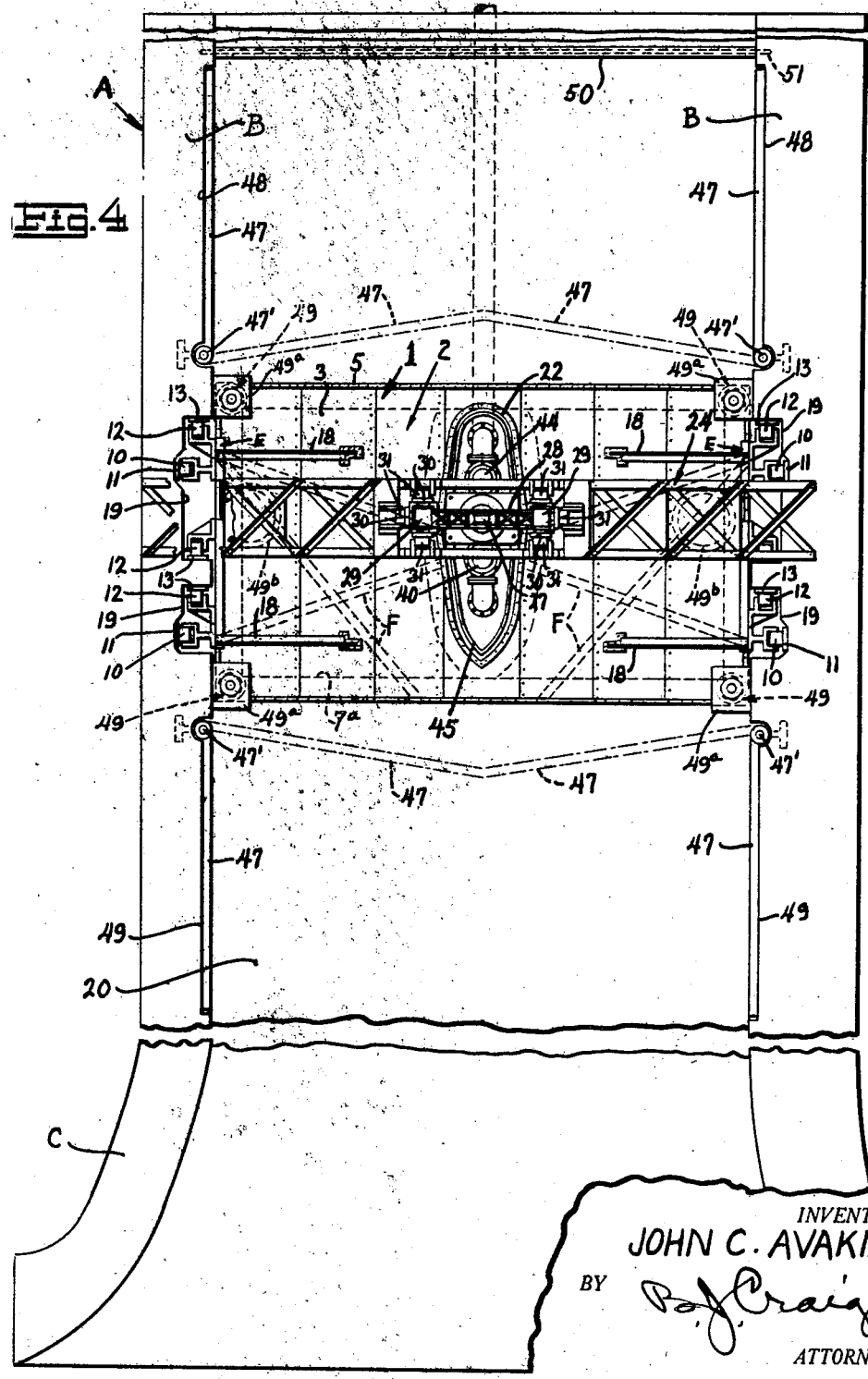

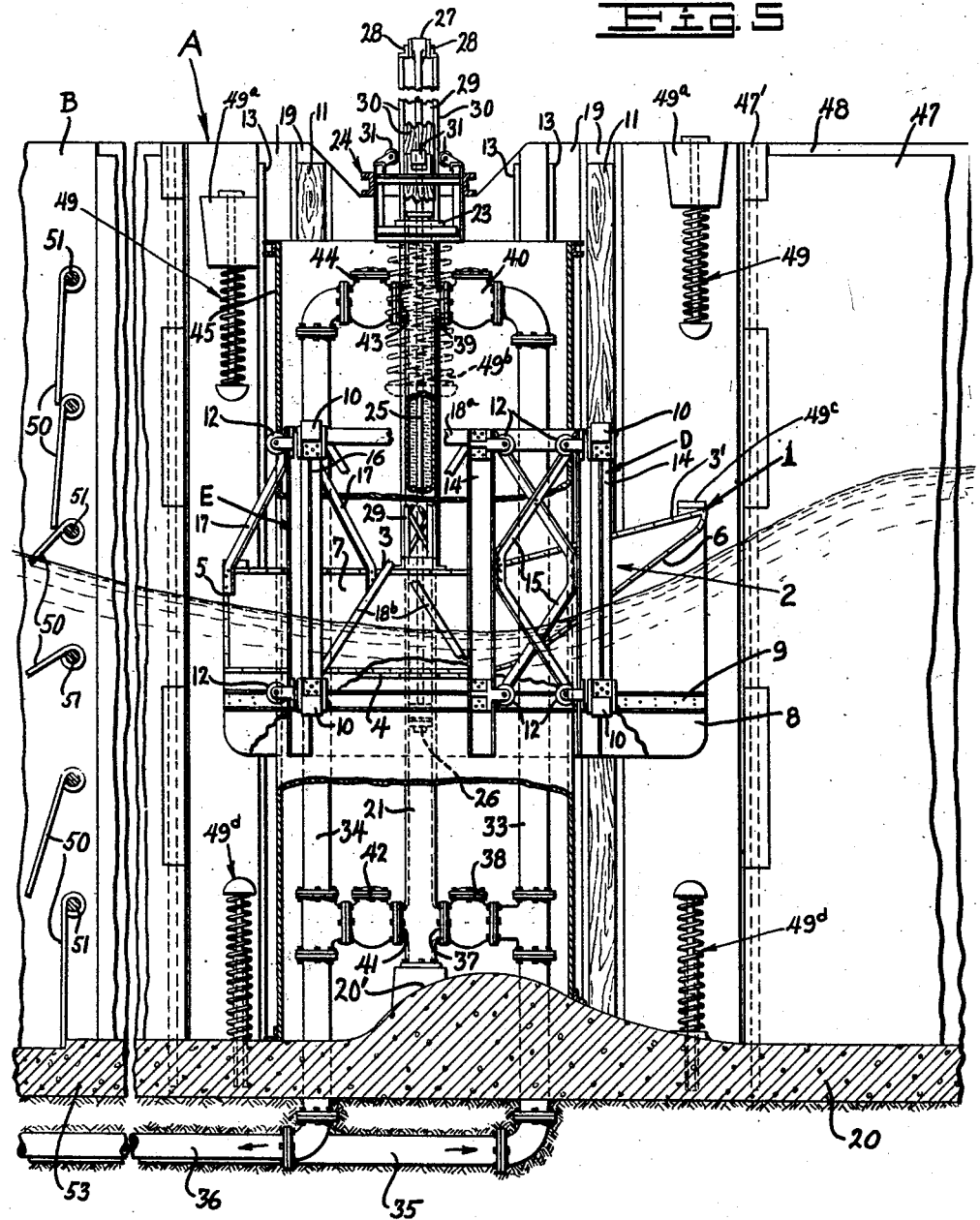

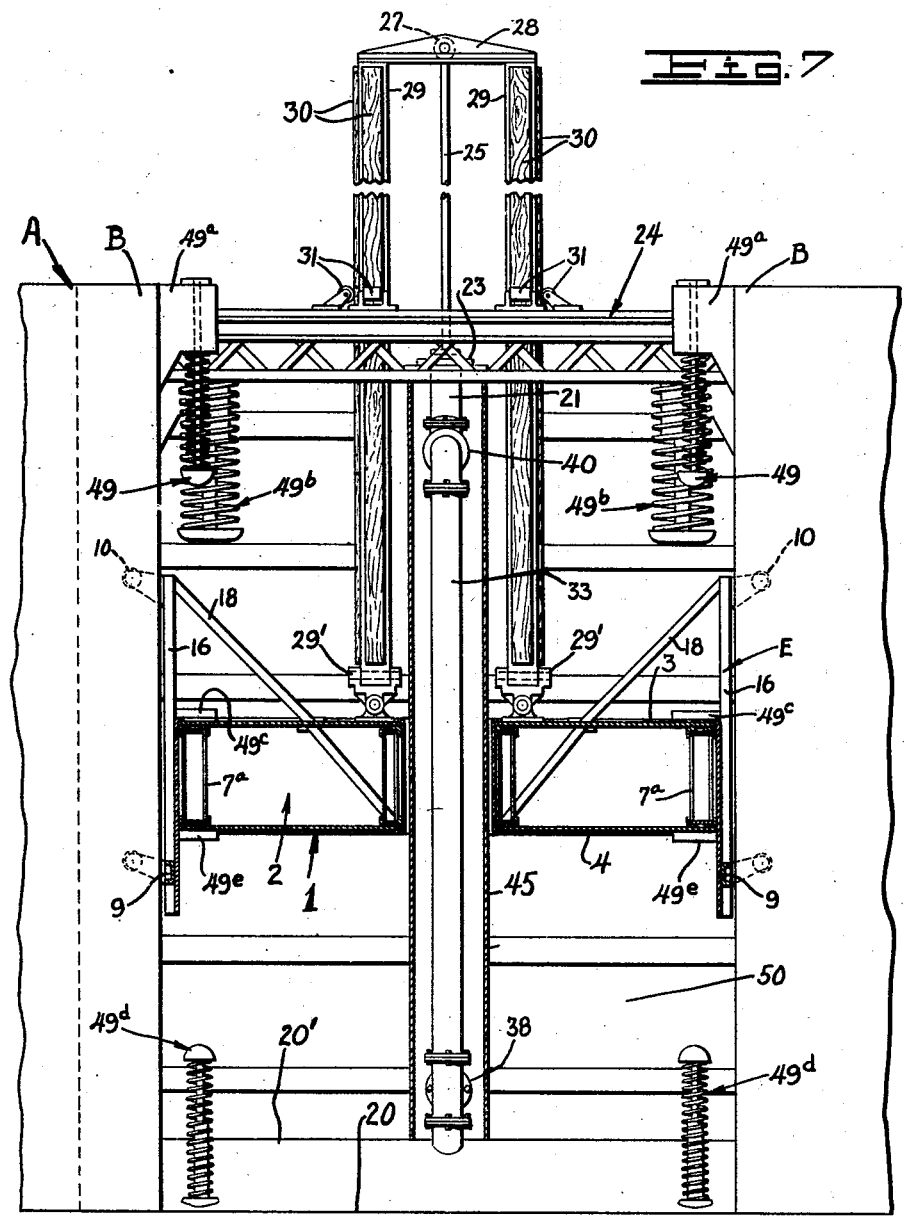

1,790,219

UNITED STATES PATENT OFFICE

JOHN C. AVAKIAN, OF LOS ANGELES, CALIFORNIA, BESSIE HORTON MORE, EXECUTRIX OF SAID JOHN C. AVAKIAN, DECEASED

CONSERVATOR OF WAVE ENERGY

Application filed June 25, 1928. Serial No. 288,192.

This invention relates to conservators of wave energy and to power systems operated thereby.

The general object of my invention is to provide an apparatus for utilization of the power in the action of waves in any suitable body of water.

A more specific general object of my invention is to store the irregular energy of wave action in a body of water, in form to be available for uniform delivery, by converting the kinetic energy in the waves into potential energy, this to be accomplished by raising some of its water to a higher elevation and storing it in a reservoir or container at a fixed elevation, the stored water to be available for any desired purpose or to discharge uniformly through a turbine or turbines to generate hydro-electric energy or to otherwise furnish power, the raising of said water being accomplished by means of a rigidly and immovably fixed water pump, or a multiplicity of them, whose piston is actuated by means of a float so shaped and trussed as to receive, harmlessly to itself and to other associated structures, a maximum of all the kinetic energy available in the waves, said float being held within a framework or structure so arranged as to receive and augment, not only the rise and fall of the waves, but also their horizontal thrusts to directing them to effect a maximum of vertical rise and fall of the float, said water from the pump or pumps being conveyed landward through pipes securely imbedded and capable of sustaining high pressure.

The storing of the irregular energy expended by the various motions of the waves may be accomplished by converting the kinetic energy in the wave motions into potential energy, by raising some of that body of water to a higher elevation and storing it in a reservoir or container at a fixed elevation, the water so stored to be available for any desired purpose or to discharge as desired through a turbine or turbines to generate hydro-electric energy or to otherwise furnish power.

The raising of the water may be done by causing all the wave motions as far as possible, unimpeded but rather augmented, to cause and allow a maximum of vertical motions to a suitable float, in turn intimately connected with the piston of a water pump, causing a maximum displacement of the piston raising water to the desired elevation and location.

The gathering of the energy in scattered localities in the waves may be accomplished by placing a multiplicity of the devices in various locations in the waves pumping water, as they may to the same container.

Another object of my invention is to provide a combination, means, device, apparatus or system whereby as much as possible of all the energy expended by the various motions of the waves, as irregular and as scattered as they may be, may be efficiently taken and effectively stored in form and place whence it may be drawn regularly and as desired.

Another object of my invention is to maintain a uniform pressure in a pipe or pipes conveying water to a turbine or turbines to generate hydro-electric energy or to otherwise furnish power, wherein the pressure is maintained by means of a multiplicity of water pumps held, arranged and operated in a suitable manner.

A further object of the invention is to provide, in a power generating system, operated by actions of waves in any suitable body of water, a suitable means, such as a reservoir or a standpipe, to provide a working head together with a conduit affording communication between the standpipe or reservoir and that body of water, and with means for generating electricity which is operated by fluid in the conduit.

A further object of my invention is to provide a power generating scheme including a container for water, a source of communication between the container and a body of water, and with a power generating device communicating with said container and which may be operated by water pumped from the body of water or by water from both the body of water and from the container simultaneously.

Another object of the invention is to provide a power generating device connected to a water container above the device and to a source of water below the device and which may be operated by water passing from the source of water below the device and which may be operated by water passing from the source of supply to the container or by water passing from the container to the source of supply, or by water from both the container and the source of supply.

A further object of the invention is to provide a novel conservator of wave energy.

Another object of the invention is to provide a novel flow control means between the walls of the framework to prevent the spent wave from returning outward over the same channel to meet the next incoming wave and thus to prevent reduction of the force of that next incoming wave.

Another object of the invention is to provide means for limiting and cushioning the highest and lowest limit of the travel of the float, in order that the travel of the float may be least destructible to itself and to its associated structure.

Another object of my invention is to provide a novel mounting for a wave conservator float.

A still further object of the invention is to provide a novel float member for use in wave conservators.

A further object is to provide means for the convenient exclusion of water, when desired, from working parts of the device in order to make repairs on the same or replacements thereof.

Another object of my invention is to provide an improved float having means thereon to carry directly the forces from the impact of the wave to the points of contact of the float with its associated structures, in order that the float may be the least destructible by the pounding force of the waves.

Other objects of the invention will be apparent from the following description taken in connection with the accompanying drawings wherein:

Fig. 1 is a perspective view of a generating plant embodying the features of my invention.

Fig. 2 is a diagrammatic side elevation showing an application of my invention.

Fig. 3 is a diagrammatic plan view showing the details of my invention.

Fig. 4 is a top plan view showing one of the units of my improved conservator of wave energy.

Fig. 5 is a section through the unit shown in Fig. 4 and shows an end view of the float with various portions broken away to more clearly illustrate the details.

Fig. 6 is an elevation of one end of the float, and

Fig. 7 is a vertical section taken through one of the floats showing the walls in elevation.

Referring to the drawings by reference characters I have indicated my wave conservators generally at A and one of them in detail in Figs. 4, 5 and 6. A single one of the wave conservators includes spaced vertical walls B, between which I mount a float 1. The front ends of the walls B diverge outwardly and gently for a considerable distance, as shown at C, to intercept a longer section of the oncoming wave and to cause it to converge as it travels landward, causing its crest to rise higher as it reaches under the float. On the other hand, upon closing of gates 50, hereinafter described, the receding water in front of the gates, diverging outwardly between the diverging walls C, tend to suck the water (like the flaring discharge of a turbine), thereby lowering the trough of the waves under the float. Thus, the diverging walls C tend to raise the crest of the waves and depress the trough thereof, thus increasing the amplitude of the vertical travel of the float.

I may employ the conservators singly or in lateral groups and they may also be used in tandem (in groups of two or three or more) depending upon the wave action and the topography in the vicinity of the installation.

The float 1 includes a hollow watertight chamber 2 formed by a top wall 3, a bottom wall 4, a rear wall 5, a front wall 6 and end walls 7 built on a framework 7ª shown as arranged within the float. The front wall 6 is inclined upwardly and the forward portion 3' of the top wall 3 is positioned at an angle to the rear portion thereof. The juncture of angular portion 3' of the top wall 3 and the front wall 6 is above the main portion of the top wall.

The end walls 7 as shown, continue down below the bottom wall 4 and form depending skirts at each end of the float as indicated at 8. These skirts 8 are adapted to be reinforced by stiffening members which are preferably channel irons 9 as shown.

On each side of the float 1, I provide rollers 10 which are adapted to operate on vertical runways 11 which may be of chemically treated wood arranged on the walls B and C and bear the end thrust of the float. Other rollers 12 are provided on each side of the float 1. These may operate on vertical wooden runways 13 on the walls C and B. These rollers are adapted to bear the forward and rearward thrust of the float 1.

The rollers 10 and 12 adjacent the front of the float are shown as mounted on frames D which include vertical members 14 secured to the end walls of the float and to the members 9 and braced by cross members 15 to form a truss-like structure.

The rollers 10 and 12 adjacent the rear of the float are shown as mounted on a frame E which includes vertical members 16 secured to the end walls of the float and to the members 9 and braced by members 17. The frames D and E are preferably further strengthened by brace members 18 (see Fig. 4) and the frames D and E are preferably tied together by brace horizontal members 18ª and inclined members 18ᵇ (see Fig. 6).

The upper ends of the frames D and E extend above the top surface of the float and the lower ends of the frames D and E extend below the bottom wall of the float so that the upper rollers 10 and 12 are a considerable distance above the top of the float and the lower rollers 10 and 12 are a distance below the bottom wall 4 of the float. This disposition of the rollers 10 and 12 prevents the float from binding while in operation.

The wooden runways 11 and 13 are preferably made of cypress and are preferably positioned in grooves 19 formed in the side walls B and C as clearly shown in Fig. 4.

The walls B and C are connected by a base 20 which has a hump 20′ thereon and on which is mounted a vertical pump casing 21 which extends through an aperture 22 in the float 1 to a point just below the top of the side walls where it is provided with a head 23 as shown in Figs. 5 and 7. The pump head 23 is preferably supported by a framework 24 which is supported by the side walls B and C.

Within the pump casing I provide a piston rod 25 which is provided adjacent its lower end with a plunger 26 of any desired type. The upper end of the piston rod 25 is pivotally connected as at 27 to a horizontal frame 28 secured to a pair of spaced vertical posts 29 which are secured to the float 1, by universal joints 29′ and bases securely held by rigid supports in the framework within the float.

The spaced posts 29 are provided on three sides with wooden runways 30 on which rollers 31 mounted on the frame 24 are adapted to actuate. These rollers 31 act as guides for the posts 29 and prevent lateral movement thereof.

A vertical inlet pipe 33 is provided on one side of the pump casing 21 and a vertical outlet pipe 34 is provided on the opposite side of the pump. The vertical inlet pipe 33 is shown as extending through the base 20 and connecting with a horizontal pipe 35 which may extend to a suitable intake location. The vertical outlet pipe 34 is shown as extending through the base 20 and connecting with another horizontal pipe 36. The pipes 35 and 36 preferably include cut-off valves 35′ and 36′ which may have a remote control if desired.

The vertical inlet pipe 33 is shown as connected to an inlet 37 adjacent the bottom of the pump casing 21 through a check valve 38 and to an inlet 39 adjacent the top of the casing 21 through a second check valve 40.

The vertical outlet pipe 34 is shown as connected to an outlet 41, opposite to the inlet 37, through a check valve 42 and to an outlet 43 opposite the inlet 39 through a second check valve 44.

Surrounding the pump casing 21, the vertical inlet pipe 33 and the vertical outlet pipe 34 I provide a guard 45 which is positioned in the aperture 22 in the float 1. This guard protects the pump and is spaced from the pump elements a distance sufficient to allow a person to descend thereinto to inspect the pump elements or to make minor repairs thereon without dismantling the wave conservator.

When it is necessary to make major repairs on the float or pump elements the float must be idle. To prevent waves striking the float, I provide front and rear gates 47. These gates 47 are each shown as pivotally secured to the side walls B and C as at 47′ and are adapted, when open, to be positioned in recesses 48 in the side walls so that the waves will not be obstructed as they pass through the device.

When the gates 47 are closed they are adapted to assume an angular position as shown by the broken lines in Fig. 4 so that the pressure of the water on the outside will tend to force them into tighter engagement. After the gates 47 are closed the water between the gates may be pumped out and workmen may enter the chamber formed by the closed gates.

The operation of my improved wave conservator is as follows: Assuming the float to be in the trough of a wave as shown in Fig. 5, the next wave to enter the device will raise the float and the posts 29 will raise the pump piston rod and piston. As the pump piston is raised it forces the water in the casing above it through the outlet 43 and through the check valve 44 into the outlet pipe 34. At the same time water is drawn from the inlet pipe 33 through the check valve 38 and inlet 37 into the pump casing. As the wave passes the float, the float again descends by its own weight into the trough of the wave and moves the pump piston downward.

As the pump piston is moved downward it forces the water in the casing below it through the outlet 41 and check valve 42 into the outlet pipe 34, and at the same time draws water from the inlet 39 into the casing. Thus the device pumps on both the raising and lowering of the float.

As each wave passes between the walls B and C the hump 20′ accentuates the wave action and tends to change the horizontal force of the wave into an upward thrust thereby causing the vertical movement of the float to be increased.

The depending skirts 8 on each side of the float prevent lateral escape of any portion of the wave passing under the float and direct all the thrust of the water upward against the float.

Suitable braces are preferably provided, as indicated at F in Fig. 4, in the interior of the float 1 which are adapted to direct the force exerted upon the front of the float by an incoming wave directly to the framework supporting the thrust rollers 10 and 12.

For limiting and cushioning the upward movement of the float, I provide spring pressed bumpers 49 which are supported by suitable brackets 49$^a$ integral with the side walls B and C and other spring pressed bumpers 49$^b$ which are supported by the framework 24. These bumpers engage the top of the float at 49$^c$.

For limiting the downward movement of the float, I provide spring pressed bumpers 49$^d$ which are supported by the base 20. These bumpers engage members 49$^e$ on the underside of the float (see Fig. 7).

Under normal working conditions the float does not strike these various bumpers. They are provided so that should the rise and fall of the waves become excessive such as in a heavy storm, the float will not be battered to pieces against the base or injure or be injured by the superstructure on the side walls B and C.

To prevent action of the backwash of the waves on the float 1, I preferably provide a plurality of superimposed gates 50 which are horizontally pivoted at their tops to transverse rods 51 supported by the side walls B and C. The lower ends of each of the gates 50 are prevented from swinging from their pivotal positions toward the float, by engagement with the next lower gate but they are free to swing away from the float. These gates 50 are preferably located beyond the ends of the gates 47 landward of the float.

As a wave passes between the side walls B and C it will swing the gates 50 away from the float and pass, but the backwash will swing the gates toward the float and close them whereupon the backwash cannot enter between the walls B and C and meet the next oncoming wave with a contrary force and reduce the effective force thereof.

As shown diagrammatically in Fig. 3 my wave conservators A, when in use, are preferably arranged in batteries of two or three or more, and a plurality of these batteries are combined as desired. When the wave conservators A are arranged as shown in Figs. 1, 2 and 3, the horizontal inlet pipes 35 of each device A are connected to a common inlet header 55 which is provided with an inlet 56 communicating with an inlet box 57. The inlet box 57 may be built in any desired manner and preferably includes a plurality of screens through which the water must pass before entering the pipe 56 so that no sand will enter the pumps.

The horizontal outlet pipes 36 of each of the devices A are connected to a common header 58 which communicates with a conduit 59. The conduit 59 preferably leads to a reservoir 60 which may be formed by a dam 61 as shown or any other desired form of reservoir may be used. Adjacent the reservoir 60 a gate valve 62 is preferably provided interposed in the conduit 59.

The reservoir 60 is provided with a flood spillway 63 which is preferably large enough not only to take care of the superfluous water pumped into the reservoir by the devices A but also take care of any excessive amount of water draining into the reservoir on account of heavy rainfalls in the back country.

A power house indicated generally at 64 is provided as near the devices A as practical and includes a plurality of hydraulic turbines of any desired type, as indicated generally at 65 in Fig. 3.

Each of the turbines 65 are connected to a common header 66 by pipes 67 each of which include a shut-off valve 68 for controlling the flow of water to each turbine. The header 66 is connected by a conduit 69 to the conduit 59. The top of a standpipe 70 is preferably of the same height as the top of the dam 61 and an overflow pipe 71 is provided on the standpipe 70 preferably at the same height as the top of the spillway 63 (see Figs. 1 and 2). For controlling the flow of water into the standpipe 70 I provide a gate valve 72 and interposed in the conduit 59 between the header 58 and the standpipe I provide another gate valve 73. The discharge from each of the turbines 65 may be through an outlet pipe 76.

When the gate valves 62 and 73 are open and the devices A are in operation to pump water into the header 58 the water is forced through the conduit 59 into the reservoir 60 and if the gate valve 72 is open the water will enter the standpipe 70. From the standpipe 70 the water passes through the conduit 69 into the header 66 and thence through the pipes 67 into the turbines 65. The discharge from the turbines pass through the pipes 74 into the header 75 and thence through the outlet 76.

If desired the gate valve 62 may be closed and the water from the header 58 conveyed through the conduit 59 into the standpipe 70 to operate the turbines 65 by the head in the standpipe 70.

If the turbines 65 require more water to operate them than is being pumped by the devices A the extra water required will be automatically drawn from the reservoir 60. When the devices A pump more water than required to operate the turbines 65 the superfluous water will be conveyed to the reservoir 60.

If for any reason the devices A did not pump any water the gate valve 73 would be closed and the water in the reservoir used to operate the turbines.

Having thus described my invention, I claim:

1. In a wave motor, a pair of spaced walls, a float positioned between said walls, an aperture in said float, a pump casing positioned in said float aperture, said pump including an operating member, means on said float adapted to actuate said member, an inlet to said pump casing and an outlet from said pump casing, a housing surrounding said pump, said inlet and said outlet, said housing being positioned in said float aperture.

2. In a wave power device, a pair of spaced walls, a base connecting said walls, a framework extending from one of said walls to the other adjacent the top thereof, a vertically movable float positioned between said walls, a bracket on each of said walls adjacent the front and rear of said float, a spring pressed plunger supported by each of said brackets and another spring pressed plunger supported by said framework adjacent each side of said float, all of said spring pressed plungers being adapted to restrict the upward movement of said float, pads on the top of said float with which said plungers are adapted to engage, other spring pressed plungers supported by said base adjacent the front and rear of each side of said float, said last mentioned plungers being adapted to limit the downward movement of said float and pads on the bottom of said float with which said last mentioned plungers are adapted to engage.

In testimony whereof, I hereunto affix my signature.

JOHN C. AVAKIAN.